US012679256B2

(12) United States Patent
Sukeforth et al.

(10) Patent No.: US 12,679,256 B2
(45) Date of Patent: Jul. 14, 2026

(54) SHOULDER STRAP RETAINER FOR CAR SEAT

(71) Applicant: MONAHAN PRODUCTS, LLC, Rockland, MA (US)

(72) Inventors: Carl J. Sukeforth, Milton, MA (US); Eric Howard Perlman, Weymouth, MA (US); Trung Q. Phung, Milton, MA (US); Stephen Alan Kender, Hingham, MA (US)

(73) Assignee: MONAHAN PRODUCTS, LLC, Rockland, MA (US)

( * ) Notice: Subject to any disclaimer, the term of this patent is extended or adjusted under 35 U.S.C. 154(b) by 193 days.

(21) Appl. No.: 18/131,609

(22) Filed: Apr. 6, 2023

(65) Prior Publication Data

US 2024/0336172 A1 Oct. 10, 2024

(51) Int. Cl.
B60N 2/28 (2006.01)

(52) U.S. Cl.
CPC .......... B60N 2/2812 (2013.01); *B60N 2/2818* (2023.08)

(58) Field of Classification Search
CPC .. B60N 2/2812; B60N 2/2806; B60N 2/2851; B60N 2/2872; B60N 2/2803; B60N 2/2818
See application file for complete search history.

(56) References Cited

U.S. PATENT DOCUMENTS

| | | | | |
|---|---|---|---|---|
| 5,609,367 | A | * 3/1997 | Eusebi | .................... B60R 22/26 |
| | | | | 280/808 |
| 5,845,967 | A | 12/1998 | Kane et al. | |
| 6,336,682 | B1 | 1/2002 | Rosko | |
| 6,986,548 | B2 * | 1/2006 | Jane Santamaria | .. B60N 2/2851 |
| | | | | 297/483 |
| 7,273,232 | B2 * | 9/2007 | Fontecchio | ............. B60R 22/26 |
| | | | | 297/483 |
| 7,703,806 | B2 | 4/2010 | Bell et al. | |
| 8,613,480 | B1 * | 12/2013 | Campbell | ............ B60N 2/2806 |
| | | | | 297/256.16 |
| 9,315,125 | B2 | 4/2016 | Long et al. | |
| 10,081,273 | B2 | 9/2018 | Johnson et al. | |
| 10,245,981 | B2 | 4/2019 | Mitchell | |
| 10,315,539 | B2 | 6/2019 | Oswald et al. | |
| 11,413,992 | B2 | 8/2022 | Zhang et al. | |

(Continued)

FOREIGN PATENT DOCUMENTS

| | | | | |
|---|---|---|---|---|
| CN | 204623215 | U | * 9/2015 | |
| CN | 104875638 | B | * 6/2017 | ............. B60N 2/265 |

(Continued)

*Primary Examiner* — David R Dunn
*Assistant Examiner* — Tania Abraham
(74) *Attorney, Agent, or Firm* — Lando & Anastasi, LLP

(57) ABSTRACT

According to at least one aspect of the present disclosure an apparatus for retaining a shoulder strap in an infant car seat is disclosed. The apparatus comprises a shell configured to retain a shoulder strap on at least three sides including a first side, a second side, and a third side, the first and second sides being opposite each other; a securing mechanism rotatably coupled to the first side and configured to extend between the first side and the second side in a first position; and a first housing coupled to the first side and configured to accommodate at least a portion of the securing mechanism in a second position.

23 Claims, 9 Drawing Sheets

(56)             References Cited

U.S. PATENT DOCUMENTS

| | | | |
|---|---|---|---|
| 2005/0184567 A1 | 8/2005 | Carpenter et al. | |
| 2006/0267387 A1* | 11/2006 | Konig ...................... | B60N 2/28 |
| | | | 297/256.1 |
| 2007/0188001 A1* | 8/2007 | Nett ...................... | F16B 45/023 |
| | | | 297/483 |
| 2008/0100122 A1* | 5/2008 | Bell ...................... | B60N 2/688 |
| | | | 297/468 |
| 2014/0084649 A1* | 3/2014 | Guo ..................... | B60N 2/2866 |
| | | | 297/250.1 |
| 2024/0217399 A1* | 7/2024 | Wirth .................. | B60N 2/2812 |

FOREIGN PATENT DOCUMENTS

| | | | | |
|---|---|---|---|---|
| CN | 214822747 U | 11/2021 | | |
| GB | 2573867 A | * 11/2019 | ............. | B60R 22/18 |

* cited by examiner

306

304

308

302

106

SHOULDER STRAP RETAINER FOR CAR SEAT

BACKGROUND

Car seats, and similar devices, are used to safely transport young children and infants in automobiles and other mobile vehicles. Car seats come in various types, including front-facing (that is, facing the driver) and rear-facing (that is, facing away from the driver), as well as other types. Car seats may be secured to cars to ensure the car seat does not move excessively during ordinary use of the car and car seat.

SUMMARY

According to at least one aspect of the present disclosure an apparatus for retaining a shoulder strap in an infant car seat is disclosed. The apparatus comprises a shell configured to retain a shoulder strap on at least three sides including a first side, a second side, and a third side, the first and second sides being opposite each other; a securing mechanism rotatably coupled to the first side and configured to extend between the first side and the second side in a first position; and a first housing coupled to the first side and configured to accommodate at least a portion of the securing mechanism in a second position.

In some examples, at least a portion of the securing mechanism nests within the first housing in the second position such that the shoulder strap may be moved in and out of the shell. In many examples, the first side and second side are opposite each other and the third side is at least partially orthogonal to the first side and the second side and coupled between the first side and the second side. In various examples the apparatus further comprises a second housing coupled to the second side. In many examples, at least of portion of the securing mechanism nests within the second housing in the first position such that the shoulder strap may not be moved out of the shell. In some examples, the second housing prevents the securing mechanism from rotating in at least one direction in the first position. In various examples, a dimension of the securing mechanism is configured such that the securing mechanism extends between the first side and the second side to nest in the second housing in the first position. In many examples, the securing mechanism is as long or longer than a distance between the first side and the second side. In various examples, a spring biases the securing mechanism in the first position. In many examples, a biasing force of the spring must be overcome to move the securing mechanism out of the first position. In various examples, the securing mechanism comprises a body portion and a hinge, the hinge being coupled to the first housing. In some examples, the securing mechanism is configured to pivot between the first position and the second position around a longitudinal axis of the hinge. In many examples, the securing mechanism further comprises a tab portion configured to allow a user to manipulate a position of the securing mechanism. In various examples, the apparatus further comprises a biasing element to bias the securing mechanism into a position. In various examples, the biasing element is a spring. In many examples, a length of the first housing is greater than or equal to a distance between the first side and the second side.

According to at least one aspect of the present disclosure an apparatus is disclosed, the apparatus comprising a shell having a first side, second side, and third side, defining an aperture configured to accommodate a shoulder strap; a securing mechanism coupled to the shell and configured to selectively enclose the aperture on a fourth side; a first housing coupled to the first side and configured to accommodate at least a portion of the securing mechanism; and a biasing mechanism configured to bias the securing mechanism into a first position.

In various examples, the first position corresponds to a position in which the securing mechanism encloses the aperture on the fourth side. In many examples, the apparatus further comprises a second housing coupled to the second side, the second housing having: a first side; a second side terminating at the first side and including a taper tapering away from the first side; and a third side terminating at the first side and including a taper tapering away from the first side, the taper of the third side and taper of the second side being isomorphic. In many examples, the apparatus further comprises a hinge coupled between the shell and the securing mechanism. In various examples the hinge allows the securing mechanism to rotate between the first position and a second position different than the first position. In many examples, the hinge is fixedly coupled to the securing mechanism and pivotably coupled to the shell.

According to at least one aspect of the present disclosure, a car seat is disclosed. The car seat comprises a headrest; a seat coupled to the headrest; at least one retainer configured to retain a shoulder strap; a shell configured to retain the shoulder strap on at least three sides; and a securing mechanism, the securing mechanism being configured to selectively retain the shoulder strap on a fourth side different from the at least three sides.

In various examples, the retainer includes: a hinge coupled between the securing mechanism and the shell and configured to allow the securing mechanism to pivot between a first position and a second position, the securing mechanism in the first position preventing movement of the shoulder strap in a first direction, and the securing mechanism in the second position allowing movement of the shoulder strap in the first direction. In many examples, the securing mechanism is biased into the first position, such that a force exceeding a threshold force must be applied to the securing mechanism to move the securing mechanism out of the first position.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Car seats have contributed substantially to a reduction in infant and child mortality and injury when crashes and other potentially harmful events occur while driving. Car seats, though important to preventing injury during crashes and similar events, are not part of most cars. Instead, most vehicles employ bucket seats or benches for passengers. Car seats may be secured to bucket seats and bench seats using the appropriate methods and parts.

Aspects and elements of this disclosure relate to using the preexisting seatbelt of the car (e.g., the standard 3-point seatbelt) to secure infants and children in a car seat. In particular, aspects and elements of this disclosure relate to apparatuses and methods for retaining the seatbelt of the car with the car seat.

Figure 1:
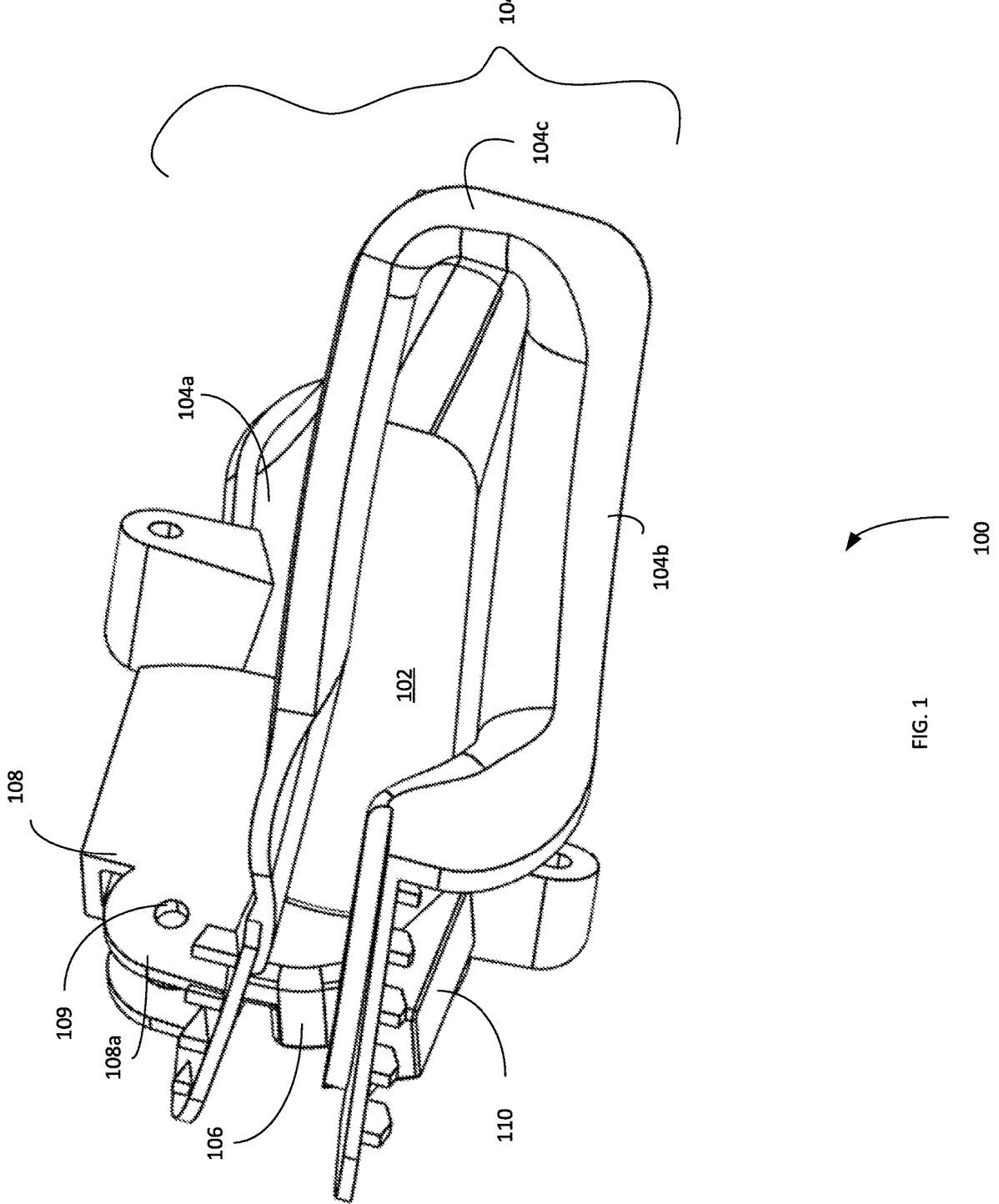
FIG. 1 illustrates a seatbelt retainer according to an example.

FIG. 1 illustrates a seatbelt retainer 100 ("retainer 100") for use with a car seat. Retainer 100 may be used with any type of car seat, including those for use with infant harnesses (e.g., 5- or 7-point harnesses) or without infant harnesses, booster seats, and other types of car seats. The retainer 100 has an aperture 102, a shell 104 having a first side 104a, a second side 104b, and a third side 104c, a securing mechanism 106, a first housing 108, and a second housing 110.

Shell 104 may be coupled to the securing mechanism 106, first housing 108, and second housing 110. In some examples, first housing 108 and second housing 110 may be part of shell 104. Securing mechanism 106 is coupled to first housing 108.

Aperture 102 allows a seatbelt (or shoulder strap) to pass through retainer 100. Aperture 102 may be a hole or slot in the shell 104. In some examples, aperture 102 is at least large enough to accommodate the seatbelt without deforming the shape of the seatbelt. That is, in most cases, a seatbelt is a flat, wide piece of synthetic material that can be deformed through folding, rolling, twisting, and so on. Aperture 102 can be sized to ensure the seatbelt does not deform when the seatbelt is at rest within aperture 102 (e.g., is retained by shell 104).

Shell 104 is a component configured to secure a seatbelt on at least three sides. In some examples, shell 104 is generally U-shaped, such that it retains the seatbelt on first side 104a, second side 104b opposite the first side 104a, and third side 104c orthogonal to first and second sides 104a, 104b. Shell 104 may be formed of a single piece or multiple pieces (such that the sides 104a-104c may be rigidly coupled together so that they share a fixed spatial relationship relative to one another).

Securing mechanism 106 is configured to prevent movement of the seatbelt out of aperture 102, as will be explained in more detail below. Securing mechanism 106 may be pivotably coupled to first housing 108. In some examples, securing mechanism 106 may be biased into a first position. In the first position, securing mechanism 106 may at least partially rest within second housing 110.

First housing 108 is configured to receive at least a portion of securing mechanism 106 and may retain securing mechanism 106 in a second position such that securing mechanism 106 no longer prevents the movement of the seatbelt out of aperture 102. The first housing 108 also includes at least one hole 109. In some examples, there are two or more holes 109. The hole 109 is configured to receive and/or contain at least a portion of the securing mechanism 106. In some examples, the hinge 306 (shown in FIG. 3) of the securing mechanism 106 may be retained within the hole 109. The hole 109 may be located in a curved portion 108a of the first housing 108. The curved portion 108a of the first housing 108 may be relatively shorter or lower compared to other portions of the first housing 108. The curved portion 108a may surround, on two or more sides, the opening 501 (shown in FIG. 5b) of the first housing 108.

Second housing 110 is configured to receive at least a portion of securing mechanism 106. Second housing 110 may be configured to prevent securing mechanism 106 from rotating and/or pivoting beyond a given range from the second position. The angle of rotation between the first and second position may be greater than 0 degrees and less than a maximum angle, the maximum angle being less than three hundred and sixty degrees. In some examples, the maximum angle will be less than 180 degrees or less than 90 degrees.

In some examples, the first housing 108 may completely accommodate the securing mechanism 106 in at least one dimension (for example, lengthwise). Accordingly, since the securing mechanism 106 is configured to prevent the movement of the seatbelt out from the aperture 102, in some examples the length of the first housing 108 in at least one direction is equal to, approximately equal to, or longer than a distance from the first side 104a to the second side 104b. In some examples, the distance between the first side 104a and the second side 104b may be equal to or approximately equal to the length of the securing mechanism 106.

Figure 2:
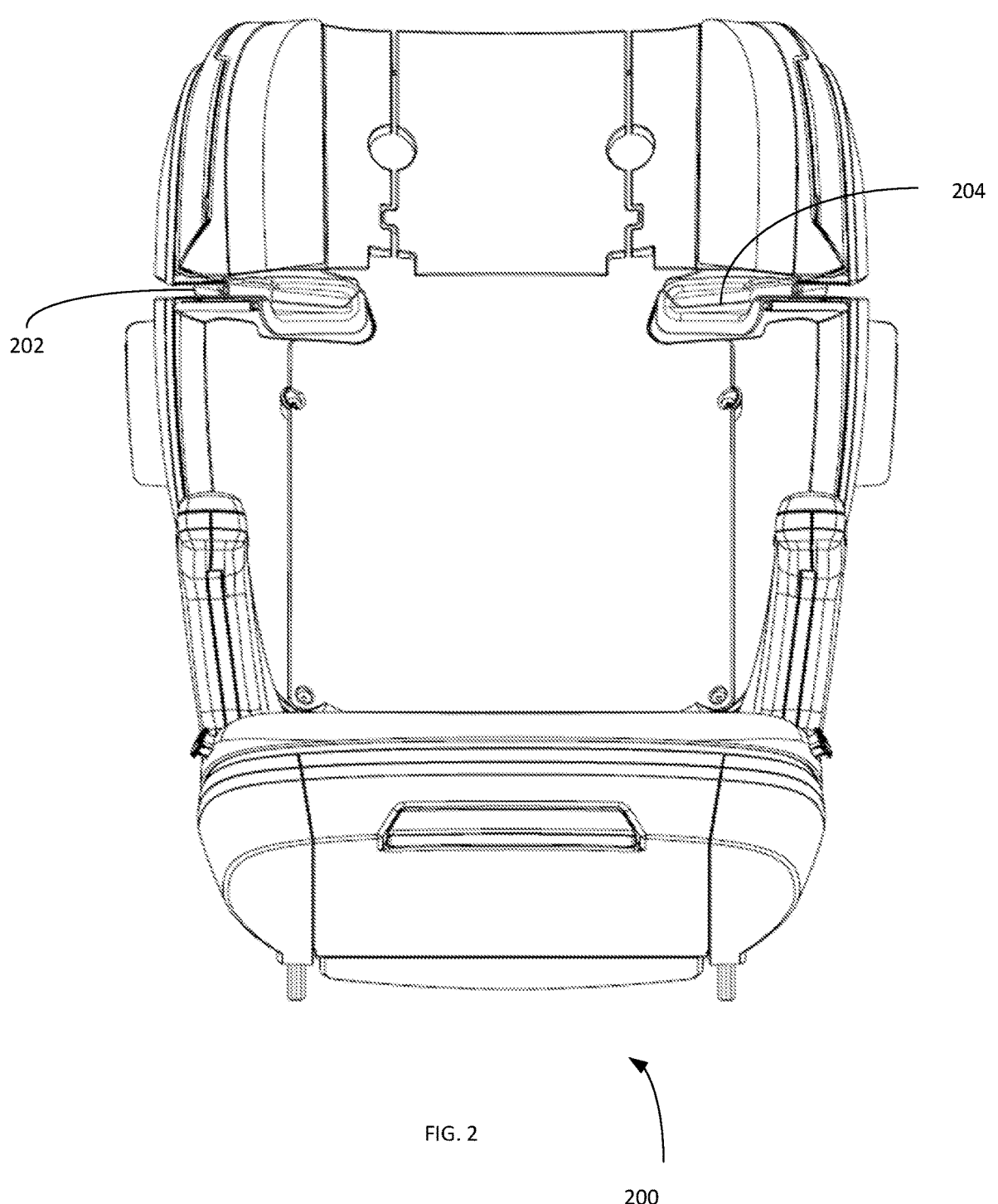
FIG. 2 illustrates a car seat according to an example.

FIG. 2 illustrates a car seat 200 according to an example. Car seat 200 includes a first retainer 202 on a first half of the car seat 200 and a second retainer 204 on a second half of the car seat 200. A seatbelt may pass through either first retainer 202 or second retainer 204, depending on the configuration of the seatbelts within the car. First and second retainers 202, 204 may be fixedly coupled to car seat 200, or removably coupled to car seat 200, and may be implemented using an embodiment of seatbelt retainer 100 of FIG. 1 described above, or any other embodiment of a seatbelt retainer described herein.

Figure 3:
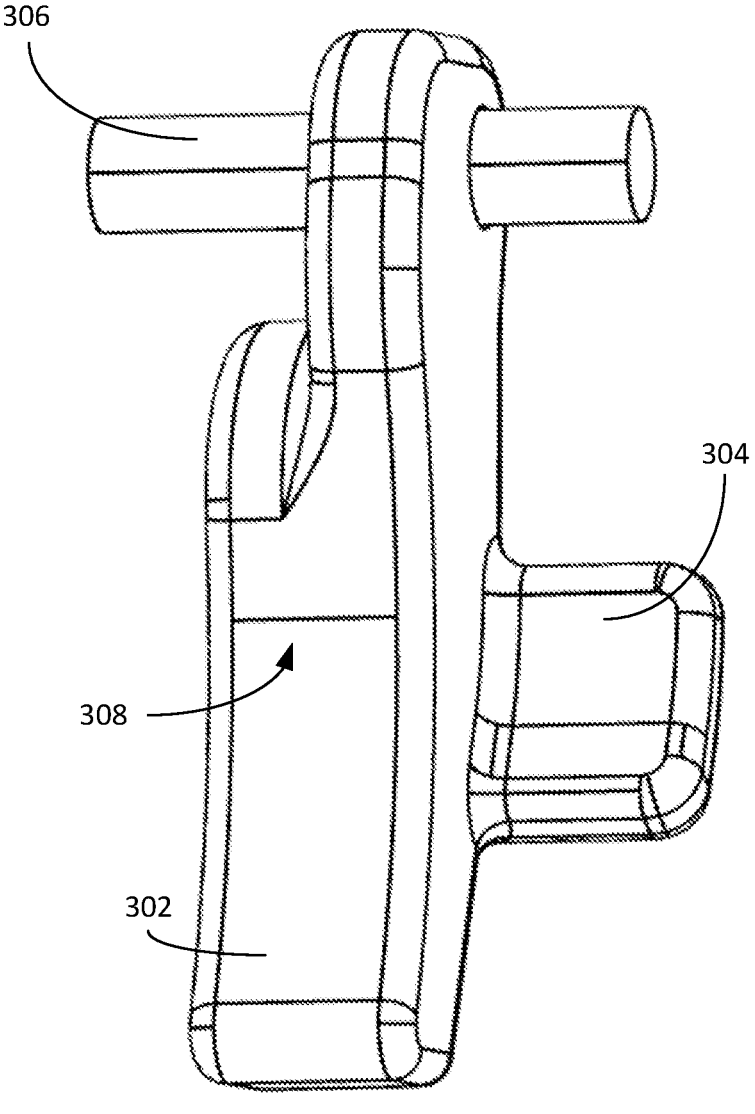
FIG. 3 illustrates a securing mechanism according to an example.

FIG. 3 illustrates securing mechanism 106 according to an example. Securing mechanism 106 includes a body portion 302, a tab portion 304, and a hinge 306. Body portion 302 is coupled to tab portion 304 and to hinge 306. In some examples, hinge 306 may be coupled to retainer 100, for example, to the first housing 108 of FIG. 1, as will be discussed in greater detail below.

Body portion 302 is long enough to prevent the movement of a seatbelt out of aperture 102 of retainer 100. For example, with reference to FIG. 1, body portion 302 of securing mechanism 106 extends from first housing 108 to second housing 110 when in the first position, thus preventing the seatbelt from moving out of aperture 102.

Hinge 306 is configured to allow securing mechanism 106 to pivot relative to the shell 104 of the retainer 100. In some examples, hinge 306 is a cylindrical portion coupled to body portion 302 of the securing mechanism 106. When securing mechanism 106 pivots (e.g., with respect to first housing 108), securing mechanism 106 rotates around the longitudinal axis of hinge 306. Hinge 306 may also be coupled to a biasing mechanism (such as a spring or a friction fit into the first housing 108) that can bias securing mechanism 106 into a desired position (e.g., first or second position, or an intermediary position). When the securing mechanism 106 is biased, a force is applied through the hinge 306 to the body portion 302 of the securing mechanism 106. The securing mechanism 106 may not be permitted to move from the first position (that is, a position where at least a portion of the securing mechanism 106 is contained with the second housing 110) by the biasing force unless a force is applied in the opposite direction of the biasing force and the force is greater than at least the biasing force.

Tab 304 is not required to retain the seatbelt within aperture 102. However, tab 304 may be configured to allow a user to push and/or pull or otherwise manipulate the position of securing mechanism 106. For example, a user could press tab 304 with a finger to cause securing mechanism 106 to pivot around an axis of hinge 306. Thus, tab 304 may facilitate the user manipulating securing mechanism 106 into first and/or second positions.

Figure 4:
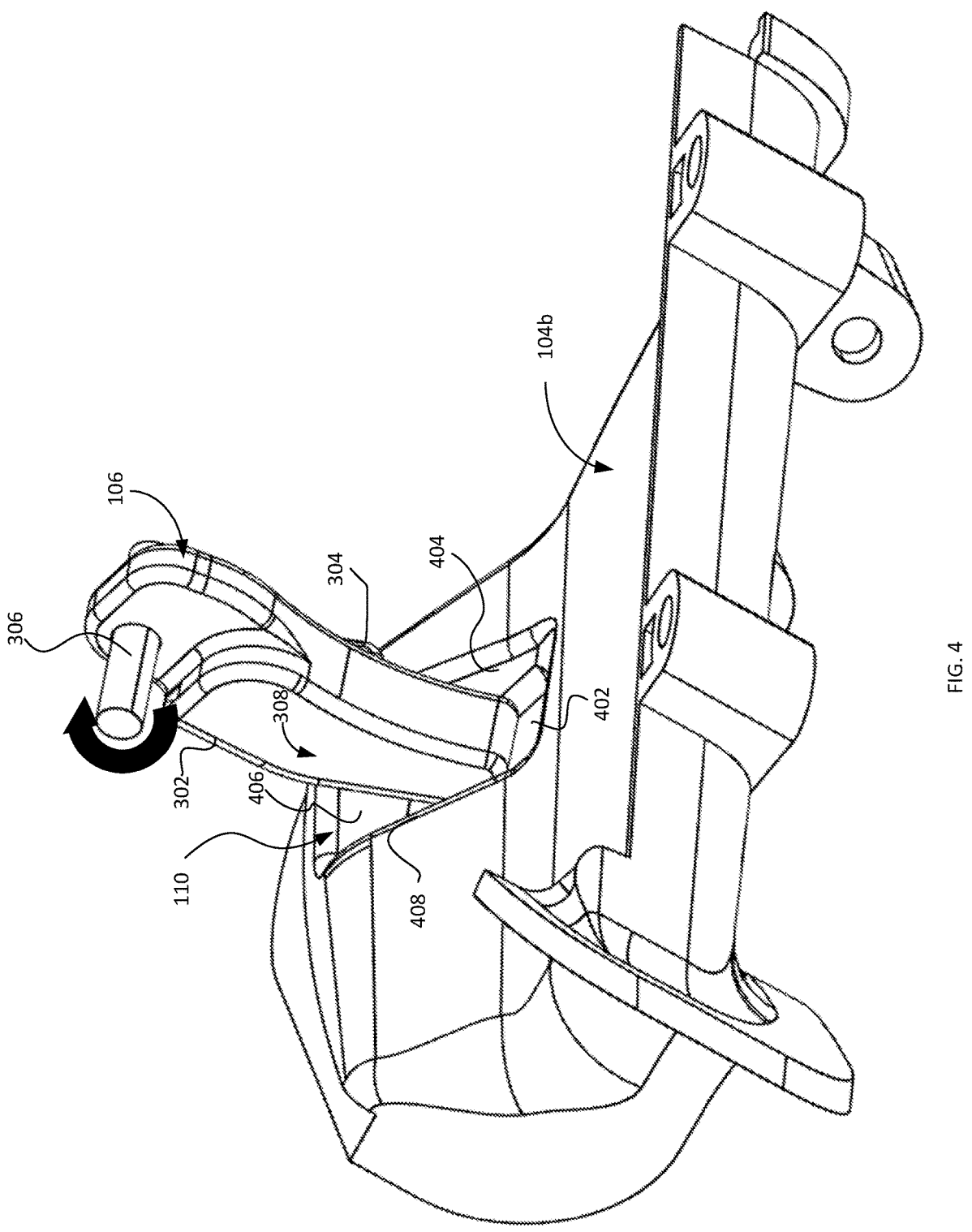
FIG. 4 illustrates a second side, second housing, and securing mechanism of the seatbelt retainer according to an example.

The securing mechanism 106 may also have a tapering point 308, which is a point at which the securing mechanism 106 begins to narrow in at least one dimension (as shown with respect to FIG. 4).

FIG. 4 illustrates second side 104*b* of shell 104, second housing 110, and securing mechanism 106 according to an example.

In FIG. 4, securing mechanism 106 is shown in first position, partially resting within second housing 110. Second housing 110 has a base 402, a first side 404, second side 406, and third side 408. As illustrated, first and third sides 404, 408 taper to become narrower the further each side is from second side 406. In some examples the tapers of the first and third sides 404, 408 are isomorphic, meaning they are identical or approximately identical. For example, the tapers may taper at the same rate and each side 404, 408 may narrow with respect to the base 402 in a similar manner, such that the first side 404 and third side 408 are mirrored versions and/or approximately mirrored versions of each other. Sides 404, 406, 408 and base 402 of second housing 110 retain securing mechanism 106 in the first position, such that securing mechanism 106 cannot rotate further in the direction indicated by the arrow. In some examples, securing mechanism 106 may not be configured to rotate beyond the first position in the direction of the arrow. Furthermore, in some examples, second housing 110 acts as a blocking mechanism to prevent securing mechanism 106 from rotating further in the direction of the arrow in the event a large force is applied to securing mechanism 106 in the direction of the arrow (such as might occur during a car crash or other accident).

The securing mechanism 106 may taper at the taper point 308. As shown in FIG. 4, the taper of the securing mechanism 106 may be such that the portion of the securing mechanism 106 that rests or is accommodated within the second housing is narrower in at least one dimension compared to the part of the body portion 302 of the securing mechanism nearer to the hinge 306. In some examples, the second side 406 is curved in such a way as to match or approximately match the taper of the securing mechanism 106 when the securing mechanism 106 is resting within the second housing 110.

Figure 5A:
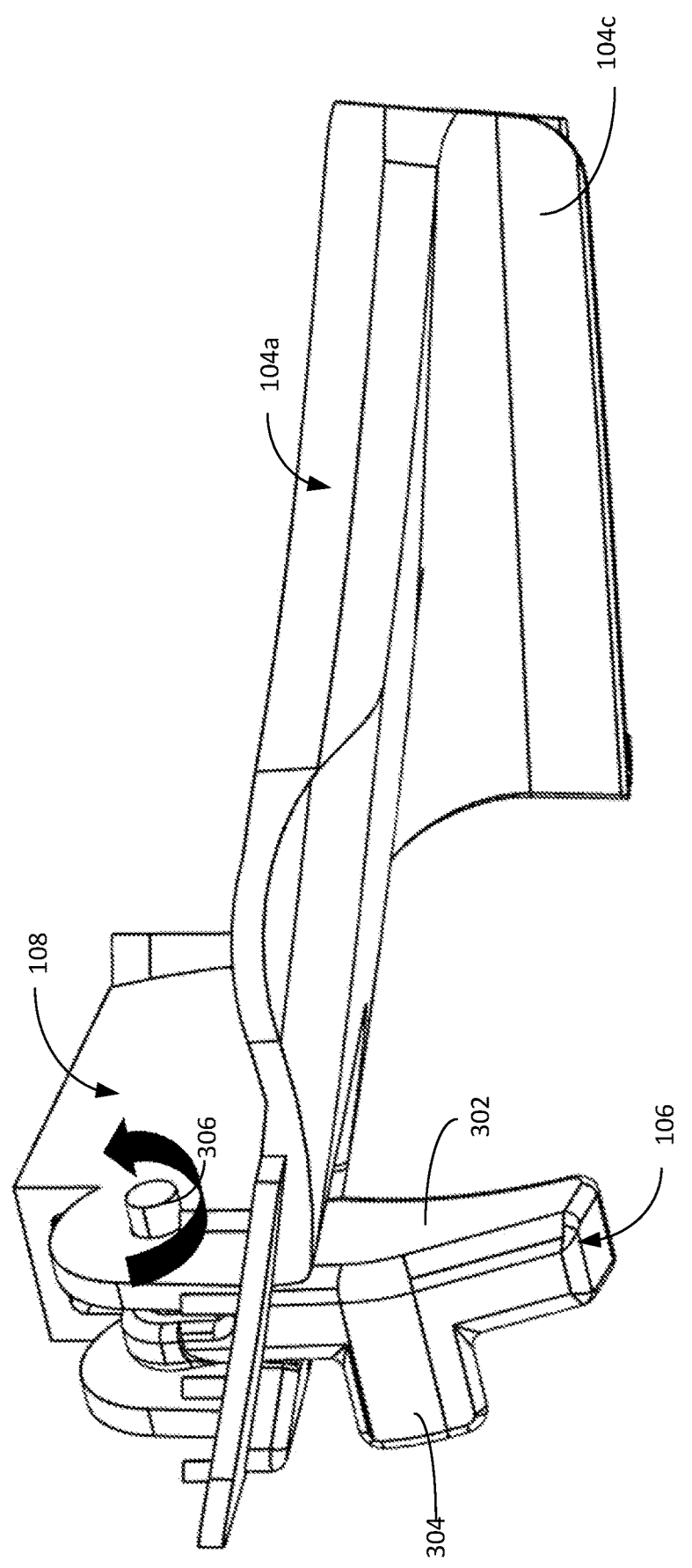
FIG. 5A illustrates the first side and securing mechanism of the seatbelt retainer according to an example.

FIG. 5A illustrates first side 104*a* of shell 104 and securing mechanism 106 according to an example.

First housing 108 may be coupled to or integral to first side 104*a*. First housing 108 protrudes away from the surface of the first side 104*a* and may be hollow. As shown, securing mechanism 106 is in the first position, which is the position in which securing mechanism 106 prevents the seatbelt from escaping retainer 100 (that is, the first position provides for barriers to the seat belt on at least four sides of the seatbelt). However, securing mechanism 106 may be manipulated into the second position by a user. When securing mechanism 106 is in the second position, at least a portion of securing mechanism 106 resides within the hollow cavity of second housing 108, such that securing mechanism 106 will not block or prevent the movement of the seatbelt out of aperture 102. In some examples, tab portion 304 of securing mechanism 106 allows the user to push, pull, or otherwise manipulate securing mechanism 106 between the first and second positions. In some examples, a user may manipulate securing mechanism 106 by pivoting securing mechanism 106 around the longitudinal axis of hinge 306. For example, the user may pivot the securing mechanism 106 from the first position to the second position by rotating securing mechanism 106 around hinge 306 in the direction indicated by the arrow (counterclockwise with respect to the page).

Figure 5B:
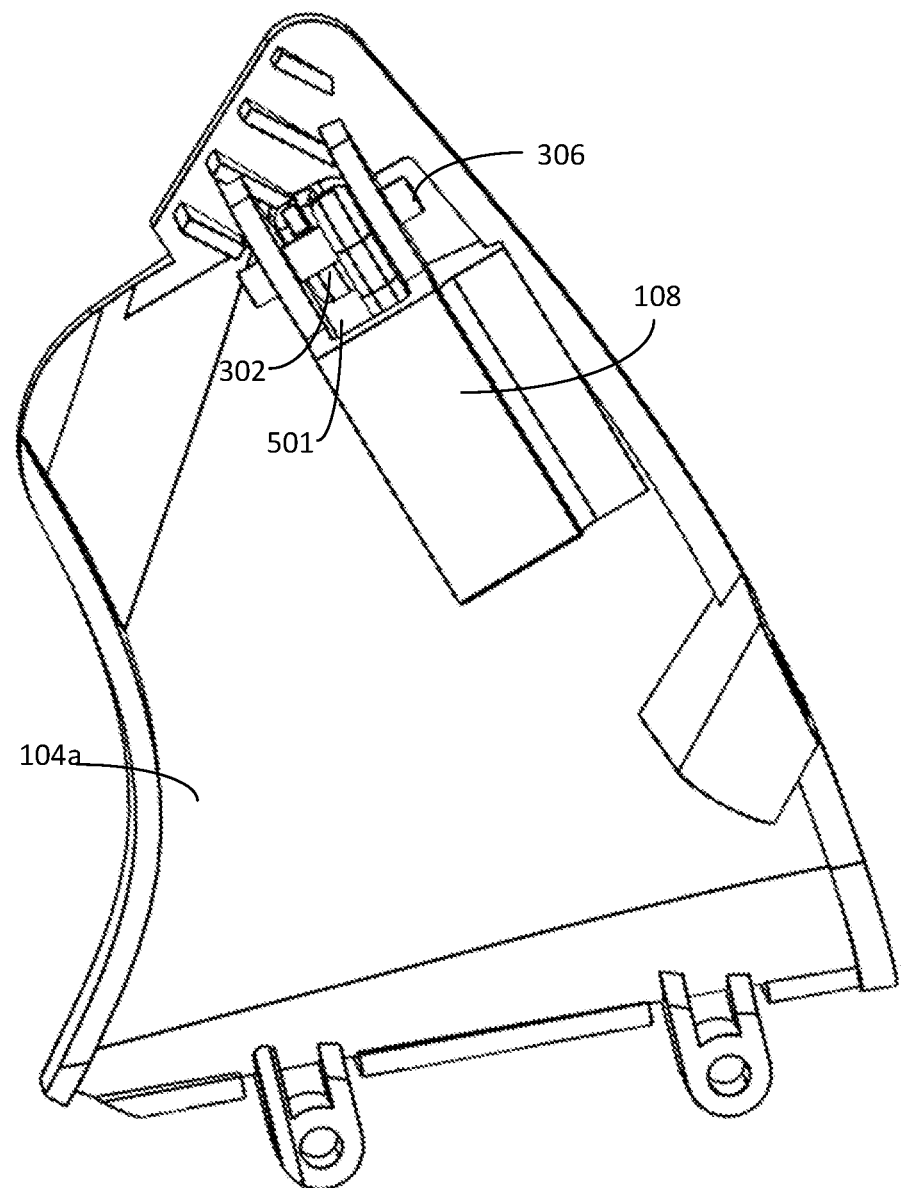
FIG. 5B illustrate a first side and a first housing of the seatbelt retainer from a top-down view according to an example.

FIG. 5B shows first side 104*a* and first housing 108 from a top-down view according to an example. An opening 501 in first housing 108 accommodates hinge 306 and a part of body portion 302 of securing mechanism 106.

Figure 5C:
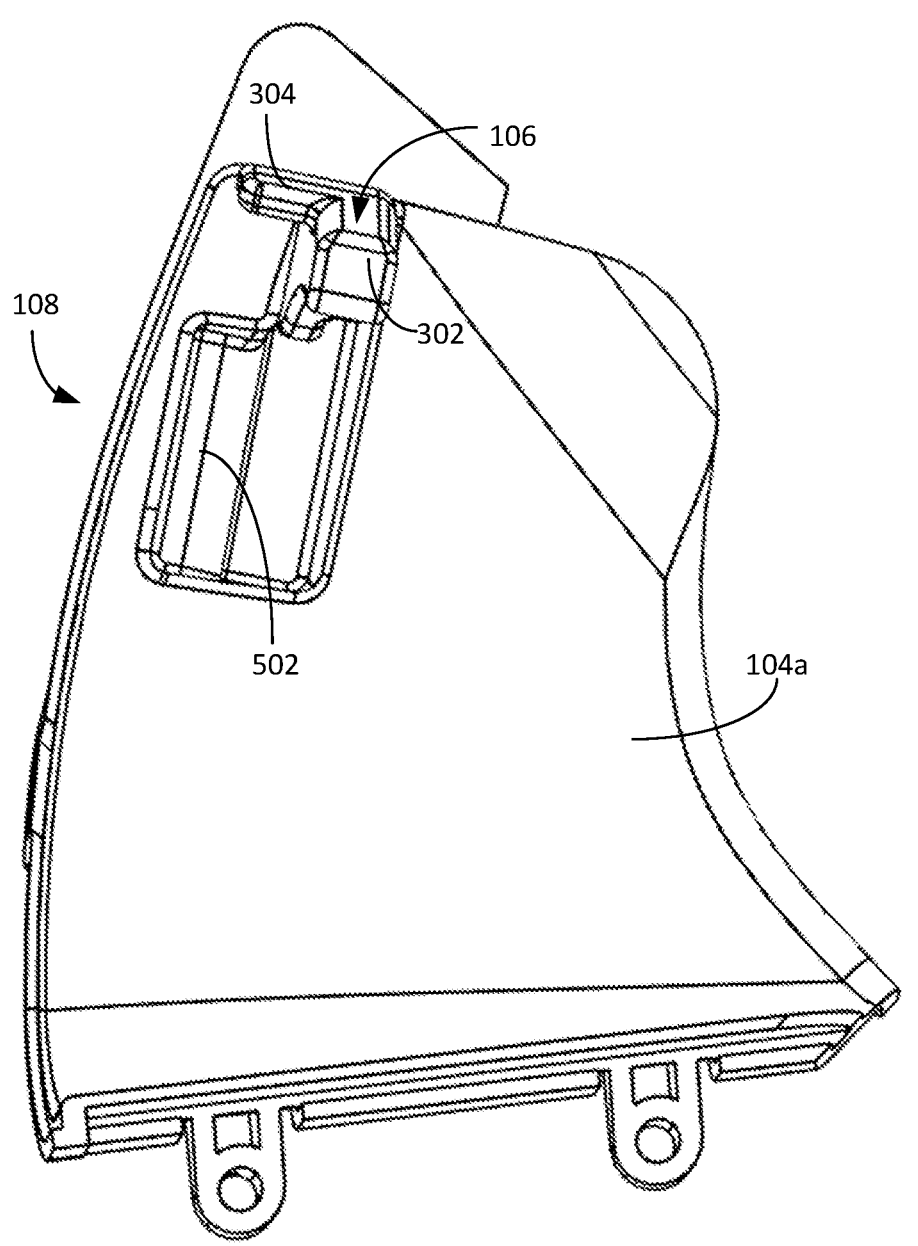
FIG. 5C illustrates the first side and first housing of the seatbelt retainer according to an example.

FIG. 5C shows first side 104*a* and an interior 502 of first housing 108 according to an example. Interior 502 of first housing 108 is large enough to accommodate at least a portion of securing mechanism 106, including both body portion 302 and tab portion 304. Interior 502 of first housing 108 is partially enclosed, having an opening into the interior 502 for securing mechanism 106 to pivot from the first position to the second position, and a smaller opening (opening 501 of FIG. 5B) to accommodate the rotational movement of securing mechanism 106. In the second position, securing mechanism 106 may be located fully within interior 502 of first housing 108. First housing 108 may also prevent or reduce the pivotability of securing mechanism 106 in at least one direction, such as the direction opposite second housing 110.

Figure 6A:
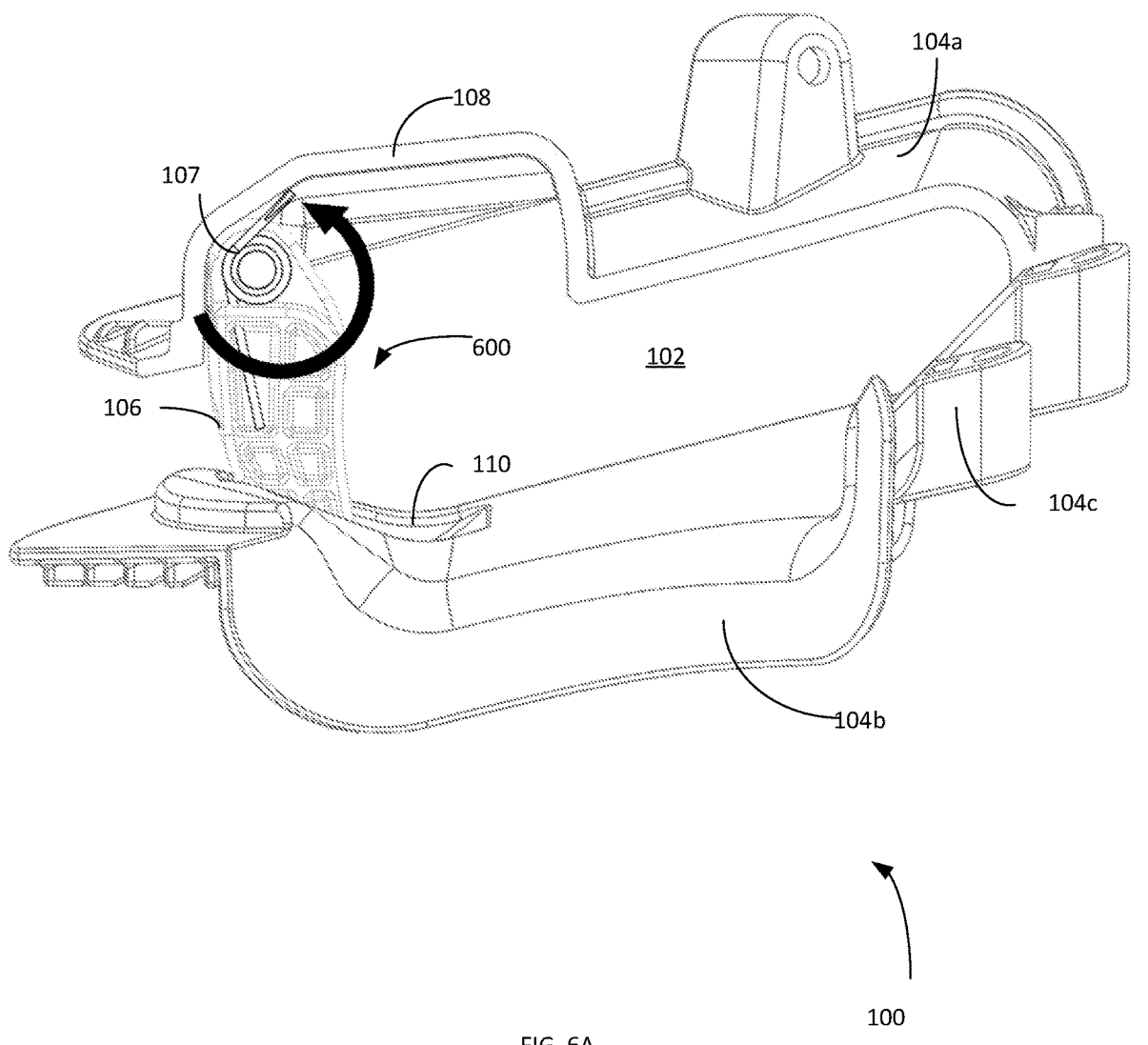
FIG. 6A illustrates the seatbelt retainer and support mechanism according to an example.

FIG. 6A illustrates retainer 100 from a partial cut-away view according to an example. As illustrated, securing mechanism 106 is in a first position 600, and first housing 108 is shown with a portion of the housing cut-away so that the interior recess may be seen. A biasing mechanism 107 is shown coupled to securing mechanism 106 around hinge 306 (not shown). Portions of biasing mechanism 107 extend along securing mechanism 106, in some examples within the interior of securing mechanism 106, to provide force to bias securing mechanism 106 into first position 600.

In first position 600, securing mechanism 106 extends across the width of aperture 102 from first housing 108 to second housing 110. At least a portion of securing mechanism 106 is retained in both first housing 108 and second housing 110 in first position 600.

Figure 6B:
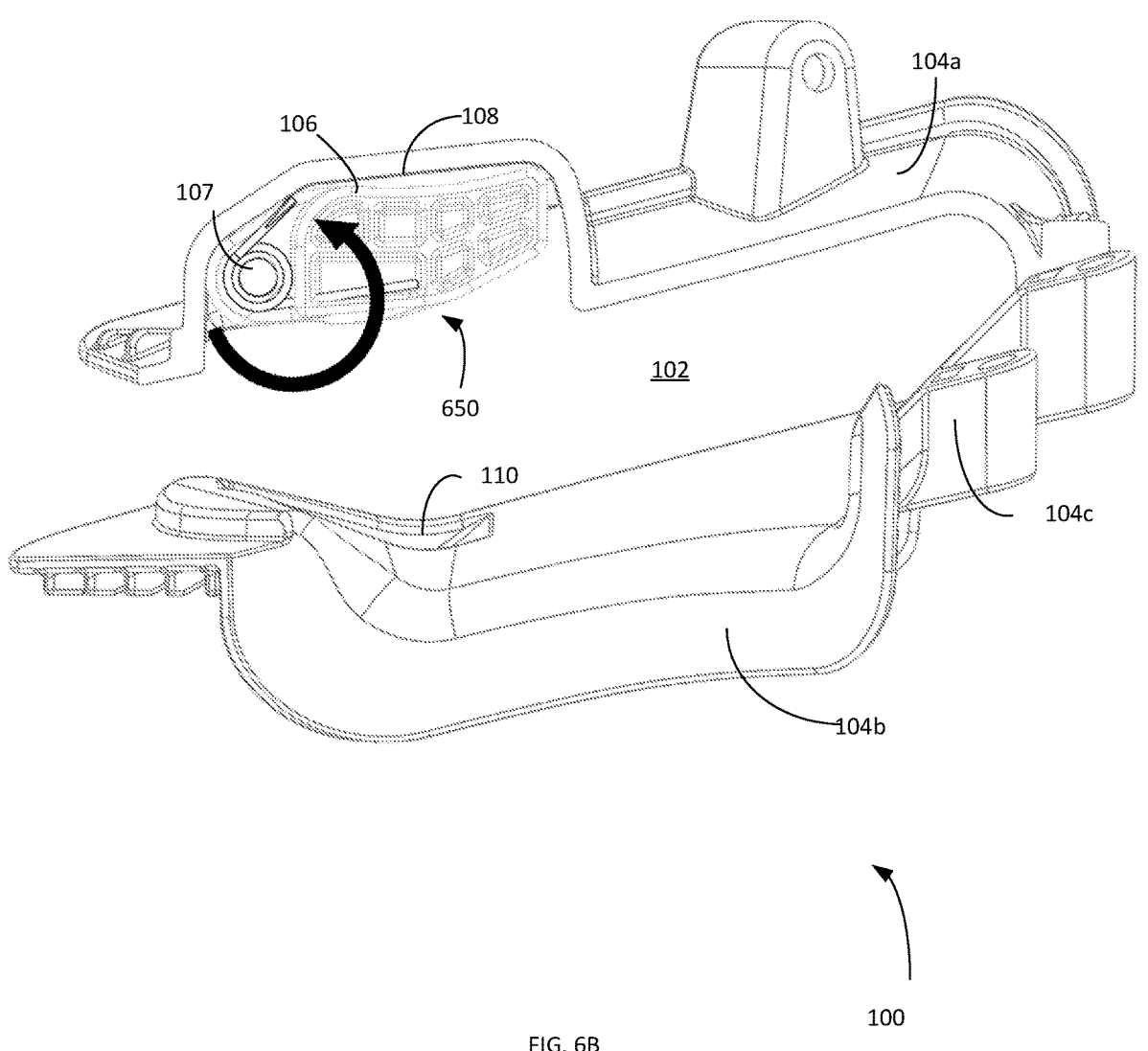
FIG. 6B illustrates the seatbelt retainer and support mechanism according to an example.

FIG. 6B illustrates retainer 100 from a partial cut-away view according to an example. The view from FIG. 6B is identical to that of FIG. 6A except that securing mechanism 106 is shown in second position 650. In the second position 650, securing mechanism 106 may be fully or partially retained within first housing 108, and will no longer prevent a shoulder strap from being removed from aperture 102. Biasing mechanism 107 may apply force to securing mechanism 106 to bias securing mechanism 106 in second position 650.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

What is claimed is:

1. An apparatus for retaining a shoulder strap in an infant car seat comprising:
   a shell configured to retain a shoulder strap on at least three sides including a first side, a second side, and a third side, the first and second sides being opposite each other, and the first side, second side, and third side define an aperture for the shoulder strap;
   a securing mechanism rotatably coupled to the first side and configured to extend between the first side and the second side in a first position to form a fourth side of the aperture;
   a first housing coupled to the first side and configured to surround the securing mechanism, in a second position, on at least three sides; and
   a second housing coupled to the second side, the second housing having:
      a fourth side;
      a fifth side, the fourth side terminating at the fifth side and including a taper tapering away from the fifth side; and
      a sixth side terminating at the fifth side and including a taper tapering away from the fifth side, the taper of the sixth side and taper of the fourth side being isomorphic.

2. The apparatus of claim 1 wherein at least a portion of the securing mechanism nests within the first housing in the second position such that the shoulder strap may be moved in and out of the shell.

3. The apparatus of claim 1 wherein the first side and second side are opposite each other and the third side is at least partially orthogonal to the first side and the second side and coupled between the first side and the second side.

4. The apparatus of claim 1 wherein at least of portion of the securing mechanism nests within the second housing in the first position such that the shoulder strap may not be moved out of the shell.

5. The apparatus of claim 1 wherein the second housing prevents the securing mechanism from rotating in at least one direction in the first position.

6. The apparatus of claim 1 wherein a dimension of the securing mechanism is configured such that the securing mechanism extends between the first side and the second side to nest in the second housing in the first position.

7. The apparatus of claim 1 wherein the securing mechanism is as long or longer than a distance between the first side and the second side.

8. The apparatus of claim 1 wherein a spring biases the securing mechanism in the first position.

9. The apparatus of claim 1 wherein a biasing force of a spring must be overcome to move the securing mechanism out of the first position.

10. The apparatus of claim 1 wherein the securing mechanism comprises a body portion and a hinge, the hinge being coupled to the first housing.

11. The apparatus of claim 10 wherein the securing mechanism is configured to pivot between the first position and the second position around a longitudinal axis of the hinge.

12. The apparatus of claim 10 wherein the securing mechanism further comprises a tab portion configured to allow a user to manipulate a position of the securing mechanism.

13. The apparatus of claim 1 further comprising a biasing element to bias the securing mechanism into a position.

14. The apparatus of claim 13 wherein the biasing element is a spring.

15. The apparatus of claim 1 wherein a length of the first housing is greater than or equal to a distance between the first side and the second side.

16. An apparatus comprising:
   a shell having a first side rigidly coupled to a second side, and a third side rigidly coupled to the second side, the first side, second side, and third side defining an aperture configured to accommodate a shoulder strap;
   a securing mechanism coupled to the shell and configured, in a first position, to selectively enclose the aperture on a fourth side;
   a first housing coupled to the first side and configured to surround the securing mechanism, in a second position, on at least three sides;
   a biasing mechanism configured to bias the securing mechanism into the first position; and
   a second housing coupled to the second side, the second housing having:
      a respective first side;
      a respective second side, the respective first side terminating at the respective second side and including a taper tapering away from the respective second side; and
      a respective third side terminating at the respective second side and including a taper tapering away from the respective second side, the taper of the respective third side and taper of the respective first side being isomorphic.

17. The apparatus of claim 16 wherein the first position corresponds to a position in which the securing mechanism encloses the aperture on the fourth side.

18. The apparatus of claim 16 further comprising a hinge coupled between the shell and the securing mechanism.

19. The apparatus of claim 18 wherein the hinge allows the securing mechanism to rotate between the first position and a second position different than the first position.

20. The apparatus of claim 19 wherein the hinge is fixedly coupled to the securing mechanism and pivotably coupled to the shell.

21. A car seat comprising:
a headrest;
a seat coupled to the headrest;
at least one retainer configured to retain a shoulder strap, the at least one retainer including a shell configured to retain the shoulder strap on at least three sides, at least two opposite sides of the at least three sides having a fixed spatial relationship relative to each other;
a securing mechanism, the securing mechanism being configured to selectively retain the shoulder strap on a fourth side different from the at least three sides, and being further configured to be surrounded on at least three sides by at least a portion of the shell when positioned to permit the shoulder strap to be removed from the retainer; and a hinge coupled between the securing mechanism and the shell and configured to allow the securing mechanism to pivot between the first position and the second position, wherein the hinge is fixedly coupled to the securing mechanism and pivotably coupled to the shell.

22. The car seat of claim 21 wherein the securing mechanism in the first position prevents movement of the shoulder strap in a first direction, and the securing mechanism in the second position allows movement of the shoulder strap in the first direction.

23. The car seat of claim 21 wherein the securing mechanism is biased into the first position, such that a force exceeding a threshold force must be applied to the securing mechanism to move the securing mechanism out of the first position.

* * * * *